US011034256B2

(12) United States Patent
Wunderlich et al.

(10) Patent No.: US 11,034,256 B2
(45) Date of Patent: Jun. 15, 2021

(54) METHOD FOR CONTROLLING A STATE OF CHARGE OF AN ENERGY STORAGE MEANS OF A MOTOR VEHICLE

(71) Applicant: AUDI AG, Ingolstadt (DE)

(72) Inventors: Matthias Wunderlich, Ingolstadt (DE); Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 120 days.

(21) Appl. No.: 16/072,600

(22) PCT Filed: Apr. 4, 2017

(86) PCT No.: PCT/EP2017/057999
§ 371 (c)(1),
(2) Date: Jul. 25, 2018

(87) PCT Pub. No.: WO2017/186460
PCT Pub. Date: Nov. 2, 2017

(65) Prior Publication Data
US 2019/0031039 A1    Jan. 31, 2019

(30) Foreign Application Priority Data
Apr. 29, 2016   (DE) .................... 10 2016 005 205.8

(51) Int. Cl.
*B60L 53/66*    (2019.01)
*B60L 55/00*    (2019.01)
(Continued)

(52) U.S. Cl.
CPC ............. *B60L 53/665* (2019.02); *B60L 55/00* (2019.02); *G01C 21/343* (2013.01); *G06Q 20/10* (2013.01);
(Continued)

(58) Field of Classification Search
CPC ........ B60L 53/60; B60L 53/665; B60L 55/00; B60L 2240/72; B60Y 2200/91;
(Continued)

(56) References Cited

U.S. PATENT DOCUMENTS 10,140,645 B2 * 11/2018 Driscoll ............. G06Q 30/0631
2009/0313098 A1   12/2009 Hafner et al.
(Continued)

FOREIGN PATENT DOCUMENTS

CN        104334398 A      2/2015
CN        105186631 A     12/2015
(Continued)

OTHER PUBLICATIONS

Notification of Transmittal of Translation of the International Preliminary Report on Patentability dated Nov. 8, 2018, in connection with corresponding International Application No. PCT/EP2017/057999 (9 pgs.).

(Continued)

*Primary Examiner* — Robert T Nguyen
(74) *Attorney, Agent, or Firm* — Maier & Maier, PLLC

(57) ABSTRACT

A method for controlling a state of charge of an energy storage device of a motor vehicle. A control device receives a first operator control signal and, only if the first operator control signal is received by a first operator control element of an operator control device and describes a user request to change a state of charge, a first operating mode of the control device is activated, whereby the control device is coupled to a power control device. A second operating mode of the control device, in which the control device is coupled to a monetarization device, is activated only if the first operator control signal is received by a second operator control element of the operator control device, the signal describing (Continued)

a user request to transmit a monetary value to a data server device external to the motor vehicle.

7 Claims, 3 Drawing Sheets

(51) Int. Cl.
*G01C 21/34* (2006.01)
*G06Q 20/10* (2012.01)
*G06Q 50/06* (2012.01)

(52) U.S. Cl.
CPC .......... *G06Q 50/06* (2013.01); *B60L 2240/72* (2013.01); *B60Y 2200/91* (2013.01); *Y02E 60/00* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(58) Field of Classification Search
CPC ...... G01C 21/343; G06Q 20/10; G06Q 50/06; Y02E 60/721; Y02T 10/7005; Y02T 10/7072; Y02T 10/7291; Y02T 90/121; Y02T 90/128; Y02T 90/14; Y02T 90/163; Y02T 90/169; Y04S 10/126; Y04S 30/14
See application file for complete search history.

(56) References Cited

U.S. PATENT DOCUMENTS

| | | | |
|---|---|---|---|
| 2010/0049639 A1 | 2/2010 | Ferro et al. | |
| 2011/0258112 A1 | 10/2011 | Eder et al. | |
| 2011/0302078 A1* | 12/2011 | Failing | H02J 5/00 705/39 |
| 2012/0053771 A1* | 3/2012 | Yoshida | B60L 55/00 701/22 |
| 2013/0024306 A1 | 1/2013 | Shah et al. | |
| 2013/0154562 A1* | 6/2013 | Szostek | B60L 53/66 320/109 |
| 2013/0204471 A1 | 8/2013 | O'Connell et al. | |
| 2014/0266004 A1* | 9/2014 | Andrews, Jr. | B60L 58/20 320/104 |
| 2015/0120499 A1* | 4/2015 | Lawrenson | B60L 53/65 705/26.35 |
| 2016/0031333 A1* | 2/2016 | Dow | B60L 11/182 307/10.1 |
| 2016/0035001 A1 | 2/2016 | Driscoll et al. | |
| 2016/0193931 A1* | 7/2016 | Adachi | H02J 3/32 307/10.1 |

FOREIGN PATENT DOCUMENTS

| | | |
|---|---|---|
| DE | 10 2008 037 575 A1 | 7/2010 |
| DE | 10 2009 028 565 A1 | 2/2011 |
| DE | 10 2010 011 704 A1 | 9/2011 |
| DE | 10 2010 031 544 A1 | 1/2012 |
| DE | 10 2012 204 021 A1 | 9/2013 |
| DE | 11 2011 105 276 T5 | 3/2014 |
| DE | 10 2013 003 411 A1 | 8/2014 |
| DE | 10 2015 107 151 A1 | 11/2015 |
| DE | 11 2014 002 012 T5 | 1/2016 |
| EP | 2 579 417 A1 | 4/2013 |
| FR | 2 992 779 A1 | 1/2014 |
| WO | 03/062018 A2 | 7/2003 |
| WO | 2009/052451 A2 | 4/2009 |
| WO | 2015019582 A1 | 2/2015 |
| WO | 2015/071712 A1 | 5/2015 |
| WO | 2015/153140 A1 | 10/2015 |

OTHER PUBLICATIONS

International Search Report dated Aug. 4, 2017 of corresponding International Application No. PCT/EP2017/057999, 7 pgs.

Written Opinion of the International Search Authority dated Aug. 4, 2017 of corresponding International Application No. PCT/EP2017/057999; 7 pgs.

Examination Report dated Feb. 8, 2017 of corresponding German Application No. 10 2016 005 205.8; 6 pgs.

Chinese Office Action dated Dec. 3, 2020, in connection with corresponding CN Application No. 201780015874.6 (21 pp., including machine-generated English translation).

* cited by examiner

METHOD FOR CONTROLLING A STATE OF CHARGE OF AN ENERGY STORAGE MEANS OF A MOTOR VEHICLE

FIELD

The invention relates to a method for controlling a state of charge of an energy storage device of a motor vehicle. In this case, an energy storage device is a component or device for the storage of electrical energy and it may be configured, for example, as a battery or a storage cell. The invention also relates to a correspondingly equipped control device and a correspondingly outfitted motor vehicle. In this case, the motor vehicle may preferably be configured as an electric vehicle, which is driven by an electric motor and which stores the electrical energy needed for its propulsion in a traction battery, for example.

BACKGROUND

A driving energy is supplied primarily as electrical energy in such a vehicle. The electrical energy is generally stored in storage cells in the form of one or more traction batteries, which can be charged or discharged under control of a power electronics unit. The environmentally beneficial effect is especially advantageous in such a motor vehicle. The energy storage device of the motor vehicle may be charged, for example, at a charging station of the user's house or at a special service station for the charging of such an energy storage device.

From DE 10 2015 107 151 A1 there is known a battery system that can be operated in a backup mode and that can provide electrical energy during a disruption that affects an energy supplier.

From US 2013/0204471 A1 there is known a system and a method for the charging of a dynamic vehicle utilizing the power grid, as well as a system and method for controlling the energy consumption in a motor vehicle. The motor vehicle here can transfer energy to other vehicles.

DE 10 2009 028 565 A1 describes a device for charging electrically powered vehicles. In this case, a wireless transport of electrical energy to a power transmission unit of another motor vehicle can occur.

However, each time there is a disadvantage here in that the user must plan ahead, because such a transfer of energy can only be undertaken if the energy storage device has sufficient energy available. The energy quantity relinquished by it is then no longer available to it.

SUMMARY

The invention is based on the object of improving an energy management of an energy storage device.

The invention is based on the idea of providing in a motor vehicle an operator control device having at least two operator control elements, wherein the first operator control element can activate an operating mode of a control device of the motor vehicle to deliver current form an energy storage device of the motor vehicle to an energy storage device external to the motor vehicle. The second of the operator control elements is equipped for the purpose of activating a second operating mode of the control device in order to transfer a monetary value by a monetarization device of the motor vehicle to a monetarization device external to the motor vehicle. In this way, regenerative energy available at different times can be better stored and distributed. Furthermore, incentives are created to make the purchase of an electric vehicle even more attractive.

The method according to the invention serves for controlling a state of charge of an energy storage device of the motor vehicle by means of a control device of the motor vehicle. In this case, the energy storage device is an apparatus or a component of an apparatus that is configured to store electrical energy and can preferably take the form of a traction battery. The control device is an apparatus or a component of an apparatus that is equipped to process signals and to generate signals and it may be configures, for example, as a control board or a microchip.

In a first step of the method, there occurs a receiving of a first operator control signal from an operator control device of the motor vehicle. An operator control device is an apparatus or a component of an apparatus that is configured to receive operator actions of a user and to transform the received operator action into an electronic signal. The operator control device comprises at least two operator control elements, i.e., at least two elements or components that can each receive an operator action. Each of the operator control elements is coordinated with an operating mode control device. The at least two operator control elements may be designed as pushbuttons or keys, for example.

Only if the first operator control signal is received by the first operator control element of the operator control device and describes a user request to change a state of charge does there occur an activating of a first operating mode of the control device. In other words, the first operator control element preferably generates a first operator control signal, coordinated with the mentioned user request. In the first operating mode there occurs a coupling of the control device to a power control device of the motor vehicle, that is, to an apparatus or a component of an apparatus that is equipped to control the energy storage device. The power control device may preferably be designed as a power electronics unit. Depending on a further operator control signal, which can preferably be generated by the first operator control element, a control signal is generated to control the state of charge of the energy storage device and to transmit the control signal to the power control device. The state of charge of the energy storage device may be controlled in such a way that the energy storage device surrenders or takes up electrical energy.

Only if the first operator control signal is received by the second operator control element of the operator control device and describes a user request to transmit a monetary value to a data server device external to the motor vehicle does there occur an activating of a second operating mode of the control device. In the second operating mode of the control device there occurs a coupling of the control device to a monetarization device of the motor vehicle, and, depending on the further operator control signal, there results a generating of a control signal to transfer the monetary value to the data server device external to the motor vehicle, and a transmittal of the control signal to the monetarization device. The monetarization device is an apparatus or a component of an apparatus that is configured to credit or remit the monetary value, that is, a monetary value in a given currency, for example, and that may comprise a bank terminal or an apparatus that can establish a communication link to a bank terminal. In other words, the monetarization device is equipped to carry out a payment. In other words, the control device generates the corresponding control signal as a function of the further operator action and the operating mode. The data server device external to the motor vehicle may comprise, for example, a data server external to the motor vehicle.

It may additionally be provided that in both operating modes the relinquishing of the energy quantity or the monetary value must by confirmed by another operator action.

In this way, it becomes possible to better store and distribute the regenerative energy which is available at different times. Furthermore, incentives are created to make the purchase of an electric vehicle even more attractive. The method according to the invention also makes it possible to pay for a service of a facility which comprises the data server device external to the motor vehicle, such as a parking garage, with energy instead of money. In other words, a so-called "energy trading" is made possible and electric mobility is stimulated.

According to one especially preferred embodiment of the method according to the invention, the control device receives an enable signal from the energy storage device external to the motor vehicle for activating the control device, wherein the enable signal preferably describes an energy quantity to be provided and/or a monetary value for the use of a service or services of a facility comprising the energy storage device external to the motor vehicle. For example, a data server of a parking garage may send, for example by a WLAN connection to the motor vehicle, an enable signal to the latter and thereby also describe, for example, the energy quantity which the user of the motor vehicle must deliver for one hour of parking. The two operating modes of the control device are thus only available if the enable signal has enabled the operating modes. This makes it easier to use the operator control device and thereby improves it.

According to another embodiment of the method according to the invention, the further operator control signal in the first operating mode may describe an energy quantity to be delivered by the energy storage device to an energy storage device external to the motor vehicle. For example, if the operator control device comprises, in addition to the at least two operator control elements, a further operator control element with, for example, a touch-sensitive monitor screen, the driver may set how much energy he would like to deliver, for example, by using a touch gesture on a slide switch of the touch-sensitive monitor screen surface. In this way, the user can better watch over the state of charge and have an overview of the energy quantity actually present.

If the further operator control signal describes a process in which the energy storage device of the motor vehicle can receive energy from an energy storage device external to the motor vehicle, the further operator control signal in the first operating mode may describe an energy quantity to be received by the energy storage device. This may be the case, for instance, when the user of the motor vehicle is taking part in a bonus system of his employer and is rewarded for using the electric vehicle by being "credited" back the quantity of energy previously relinquished in a parking garage, for example, when his energy storage device is being recharged.

If the user selects the second operating mode, then according to another embodiment the further operator control signal in the second operating mode may describe a monetary value to be transmitted from the monetarization device. In this way, the user for example may limit parking garage fees by determining in advance, when driving into the parking garage for example, how long he would like to stay.

According to another especially preferred embodiment of the method according to the invention, there may occur a receiving of a position signal from a navigation device of the motor vehicle, which describes a current position and a planned destination of the motor vehicle. The navigation device is an apparatus or a component of an apparatus that is equipped for route planning and/or navigation. The control device makes a determination of a location of an energy storage device external to the motor vehicle that is equipped to receive an energy quantity from the energy storage device of the motor vehicle. A navigation signal is generated, which describes an itinerary for the motor vehicle, which may take into account the determined location of the energy storage device external to the motor vehicle and the planned destination, as a function of the position signal and the determined location. In other words, the determined location of the energy storage device external to the motor vehicle and the planned destination are factored into the calculating of the itinerary. In this way, during his travel, the user is taken past those facilities where he can pay for corresponding services by the monetary value and/or by the energy quantity.

For the further improvement of the operating ease of the operator control device and to make possible an intuitive operation, a controlling of an output device of the operator control device may take place as a function of the operating mode, wherein an illumination of at least one of the operator control elements and/or an output of an acoustic signal can be controlled. The output device is a component of an apparatus or a component that is configured to deliver an optical and/or acoustical and/or tactile signal. For example, the operator control elements may be color-coded so that the user can see whether or not there is available the possibility for him to deliver the energy quantity. Alternatively, the controlling of the output device of the operator control device can be carried out as a function of the enable signal of the data server device external to the motor vehicle.

For an even more user-friendly management of the energy quantity, the control device may receive a state of charge signal from the power control device, wherein the state of charge signal may describe a current state of charge of the energy storage device. A remaining range of the motor vehicle may be determined as a function of the received state of charge signal. The control device may further receive the position signal from the navigation device of the motor vehicle, which may describe a distance to a planned destination of the motor vehicle. An energy quantity not required to reach the planned destination may be determined as a function of the current state of charge, the determined remaining range and the distance to the destination. In other words, a surplus energy quantity is determined, which is not required to reach the destination, and which can be relinquished for example to the parking garage. A blocking signal, which blocks the activating of the first operating mode, is generated as a function of the determined energy quantity. In this way, the user can be prevented from surrendering too large a quantity of energy in the parking garage that he would no longer be able to reach his destination.

The aforementioned object is also achieved by a control device that is equipped to carry out a method according to one of the above-described embodiments.

The above-stated object is also achieved by a motor vehicle comprising a control device according to the invention.

BRIEF DESCRIPTION OF THE DRAWINGS

The invention shall be explained more closely by concrete exemplary embodiments with the aid of the accompanying drawings. The exemplary embodiments explained below are preferred embodiments of the invention. However, the described components of the embodiments in the exemplary embodiments each time represent individual features of the invention, to be viewed independently of one another, and which also depict the invention independently of one another and therefore are to be seen as part of the invention also individually or in a combination other than the one shown. Furthermore, the described embodiments may also be amplified by other features among the already described features of the invention. Elements with the same function have the same reference numbers in the figures. Shown therein are.

DETAILED DESCRIPTION

Figure 1:
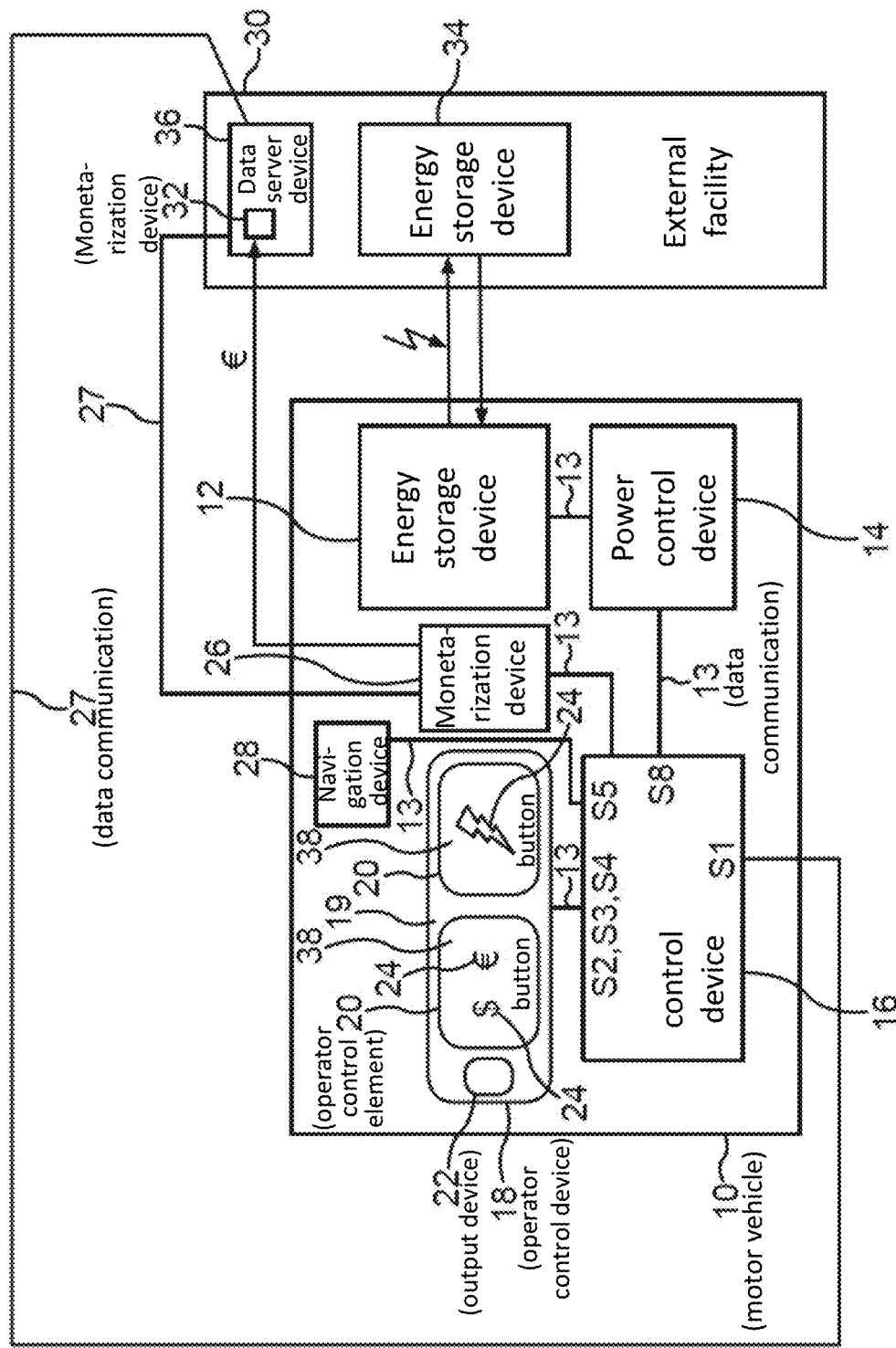
FIG. 1 a schematic sketch of an embodiment of the method according to the invention.

FIG. 1 illustrates schematically the principle of the method according to the invention with the aid of a first exemplary embodiment. For this, FIG. 1 shows a motor vehicle 10, which can preferably be designed as an automobile. Preferably, the motor vehicle 10 may be designed as a passenger car, especially an electric and/or hybrid motor vehicle having an electric motor.

The motor vehicle 10 comprises an energy storage device 12, which may preferably be designed as a traction battery. The energy storage device 12 is connected via a data communication link 13, such as a data communication link of an onboard network of the motor vehicle 10, to a power control device 14, which may comprise, for example, a power electronics unit. The power control device 14 may be designed, for example, to convert the voltage provided by the energy storage device 12 into a voltage required by the electric motor. The power control device 14 may, for example, also comprise a rectifier, in order to feed energy back to the energy storage device 12. The power control device 14 may also preferably comprise a battery management system, which is equipped to regulate and monitor the energy storage device 12. Such a device serves as a charge regulator and is responsible for an uninterrupted power supply of the motor. The power control device 14 may monitor, for example, a state of charge, a load distribution, a temperature of individual cells of the energy storage device 12, and a development of a charging capacity.

A control device 16 may be designed for instance as a control board or a control chip. The control device 16 is coupled to an operator control device 18.

The operator control device 18 may have, for instance, a key pad 19 and two operator control elements 20, for example, wherein the operator control elements 20 may be designed for instance as pushbuttons or keys. Alternatively or additionally, the operator control device 18 may have a touch-sensitive surface, i.e., a so-called "touch screen". Optionally, the operator control device 18 may have an output device 22, which may be designed for instance as a monitor screen and/or as a speaker.

The operator control device 18 may also be designed, for example, as a touch-sensitive monitor screen of a so-called "multimedia interface", i.e., as an operator terminal with a central monitor screen in the dashboard of the motor vehicle 10.

In the example of FIG. 1, one surface of an operator control element 20 may have a symbol 24. For example, the first operator control element 20, which may be assigned the function of coupling the control device 16 to the power electronics unit 14, may have a lightning sign as the symbol 24, in order to indicate the function to the user. The second operator control element 20, which is assigned the function of coupling the control device 16 to a monetarization device 26, may have a currency symbol as the symbol 24.

The monetarization device 26 may be designed for instance as a processor of an infotainment system of the motor vehicle 10 (not shown in FIG. 1) or of the control device 16 or of a special component. In this case, the monetarization device 26 is equipped to establish a data communication link 27 to a monetarization device 32 external to the motor vehicle of a facility 30. Such a communication link may be designed as wireless or as a wired line, preferably wireless, for example a WLAN or Internet connection.

The monetary value, for example, may be a monetary value of a given currency. The monetarization device 26 is designed to transfer such a monetary value to the monetarization device 32 external to the motor vehicle of the facility 30. For this, for example, a user may save a credit card number in an electronic memory of the motor vehicle 10, for example, a memory of an infotainment system, or store a monetary value for example on a chip (not shown in FIG. 1). The monetarization device 26, in other words, may be designed and equipped with an automatic payment system known to the person skilled in the art from the prior art.

The motor vehicle 10 may furthermore optionally comprise a navigation device 28, which, for example, may be designed as a navigation gear. The navigation device 28 may be a navigation device 28 known to the person skilled in the art from the prior art. It may be designed to use the current position of the motor vehicle 10 in order to generate a position signal which can describe the current location or the current position of the motor vehicle 10. With the aid of a destination entered by the user, the navigation device 28 can generate an itinerary or travel route in the traditional manner known to the person skilled in the art from the prior art.

The facility 30 may be, for instance, a parking garage or a service station or a restaurant with drive-through switches. The facility 30 comprises an energy storage device 34 in addition to the optional monetarization device 32. This may likewise be designed for instance as a traction battery or as a storage battery or as an induction coil. The energy storage device 34 in the facility 30 may additionally or alternatively be designed to deliver energy to the energy storage device 12 of the motor vehicle 10. The facility 30 likewise has a data server device 36 external to the motor vehicle, which may comprise for instance the monetarization device 32 external to the motor vehicle.

In the present example, the data server device of the facility 30 external to the motor vehicle may generate an enable signal, which can be transmitted to the control device 16. The transmission of the signal may occur, for instance, by way of a WLAN connection in the motor vehicle 10 or by way of an Internet connection as the data communication link. The control device 16 may receive this enable signal (step S1 of the method) and the control device 16 can be activated by this enable signal. The enable signal may, for example, also describe a fee schedule of the facility 30, such as a parking fee. Alternatively, it may be provided that the enable signal can be transmitted via the data communication link to the operator control device 18, which can be activated in this way.

As soon as the control device 16 and/or the operator control device 18 has been activated, it may be provided that the control device 16 can transmit a control signal to an output device 22 of the operator control device 18, which may control, for example, an illumination of the operator control elements 20.

An electricity price or monetary price may be displayed to the user, for example, on a monitor screen of the motor vehicle 10 or on the output device 22 of the operator control device 18. Upon detecting an operator action of the operator control element 20 shown on the right in FIG. 1, i.e., for example, a pressing of the exemplary "electricity key", the user can arrange to pay by delivering energy. By pressing the operator control element 20 on the left in FIG. 1, the user request to pay in cash can be printed out. In both instances, a corresponding operator control signal is sent to the control device 16, which receives this first operator control signal (S2). When the first operator control element 20 is operated, a first operating mode is activated (S3) in that the control device 16 is coupled to the power control device 14. In a second operating mode, by pressing the operator control element 20 to select a monetary settlement, the control device 16 is coupled to the monetarization device 26 (S4).

In the first operating mode, the power control device 14 then orders the delivery of an energy quantity to the energy storage device 34 external to the motor vehicle (indicated by an arrow in the figure). In this case, corresponding control signals for regulating the battery state of charge are known to the person skilled in the art from the prior art. Similarly, the transfer of the monetary value by the monetarization device 26 is arranged for in a manner known to the person skilled in the art. For example, to do so, the user may have saved his credit card number in a profile of the infotainment system and the monetarization device 26 can then debit this credit card number for a predetermined amount.

Because now the possibility exists of exchanging energy between the motor vehicle 10 and a facility external to the motor vehicle or the data processing device and vice versa, the user has the choice or the opportunity to pay with electricity, on the one hand, or with monetary means, on the other hand.

Alternatively or additionally, it may be provided that in the first operating mode the energy storage device 12 of the motor vehicle 10 can obtain an energy quantity from the external energy storage device 34. A corresponding technique for this is known from the prior art to the person skilled in the art.

It may be provided that the power control device 14 generates a state of charge signal, which may describe a current state of charge of the energy storage device 12 of 75 percent, for example. This signal may be transmitted to the control device 16. From the navigation device 28, the control device may receive a position signal, which may describe, for example, a distance to a planned destination, such as the employer of the user. With the aid of the position signal, the control device 16 can then determine a remaining range of the motor vehicle 10. If the route to the employer amounts to 20 kilometers, for example, a remaining capacity may be indicated by the output device 22. If the determination reveals that the energy storage device 12 of the motor vehicle 10 is still storing a surplus of 10 kilowatt hours, for example, then a parking garage fee of one kilowatt hour per hour can still be paid. If the surplus is not enough, the operator control device and/or the first operator control element 20 may be deactivated for payment by electricity.

The position signal may also be used, for example, to generate an itinerary which may pass by a suitable facility 30. For example, if the navigation device 28 has already calculated an itinerary, the control device 16 may calculate an alternative itinerary, so that the user, for instance on the way to work, may drive past a parking garage with the proper equipment. The user may then park in the parking garage, pay with electricity, and run errands, for example.

The control device 16 may furthermore provide an acoustic and/or tactile and/or optical feedback. According to another exemplary embodiment, for example, in the case of a no-cost transfer of an energy quantity from the energy storage device 34 external to the motor vehicle to the energy storage device 12 of the motor vehicle 10, for example through the employer, a button 38 of the operator control element 20 for the first operating mode may change color. For this, the operator control device 18 may have a lighting means, such as an LED or several LEDs of different colors, which can be controlled, for example, by the control device 16. The no-cost transfer may be indicated visually to the user. In addition or alternatively, the operator control device 18 may have a speaker, for example, as the output device 22, which can output a beep, for example.

For example, in the case of an energy delivery by the facility 30 external to the motor vehicle, the symbol 24 of the first operator control element, such as the lightning sign, may light up green or yellow, and/or a button 38 of the operator control element 20 surrounding the symbol 24 may light up green.

In the event of an automatic activation of the operator control device 18 and thus of the operator control element 20, the operator control elements 20 may be represented, for example, with a blue frame or button 38, that is, blue LEDs may be turned on for the framing or button. The lightning symbol 24 may then be lit up, for instance, with the help of a yellow lighting means. This can then signify, for instance if one is driving into a parking garage, that the enable signal can be relayed by WLAN or a connect link or an Internet link, so that the operator control element or the operator control elements 20 light up blue, and therefore the driver is aware that he can pay with electricity at this facility 30. If no such enable signal is sent and thus the two operating modes are blocked, the key pad, i.e., the display field and/or the operator control element 20 can be grayed out, that is, not lit up.

Figure 2:
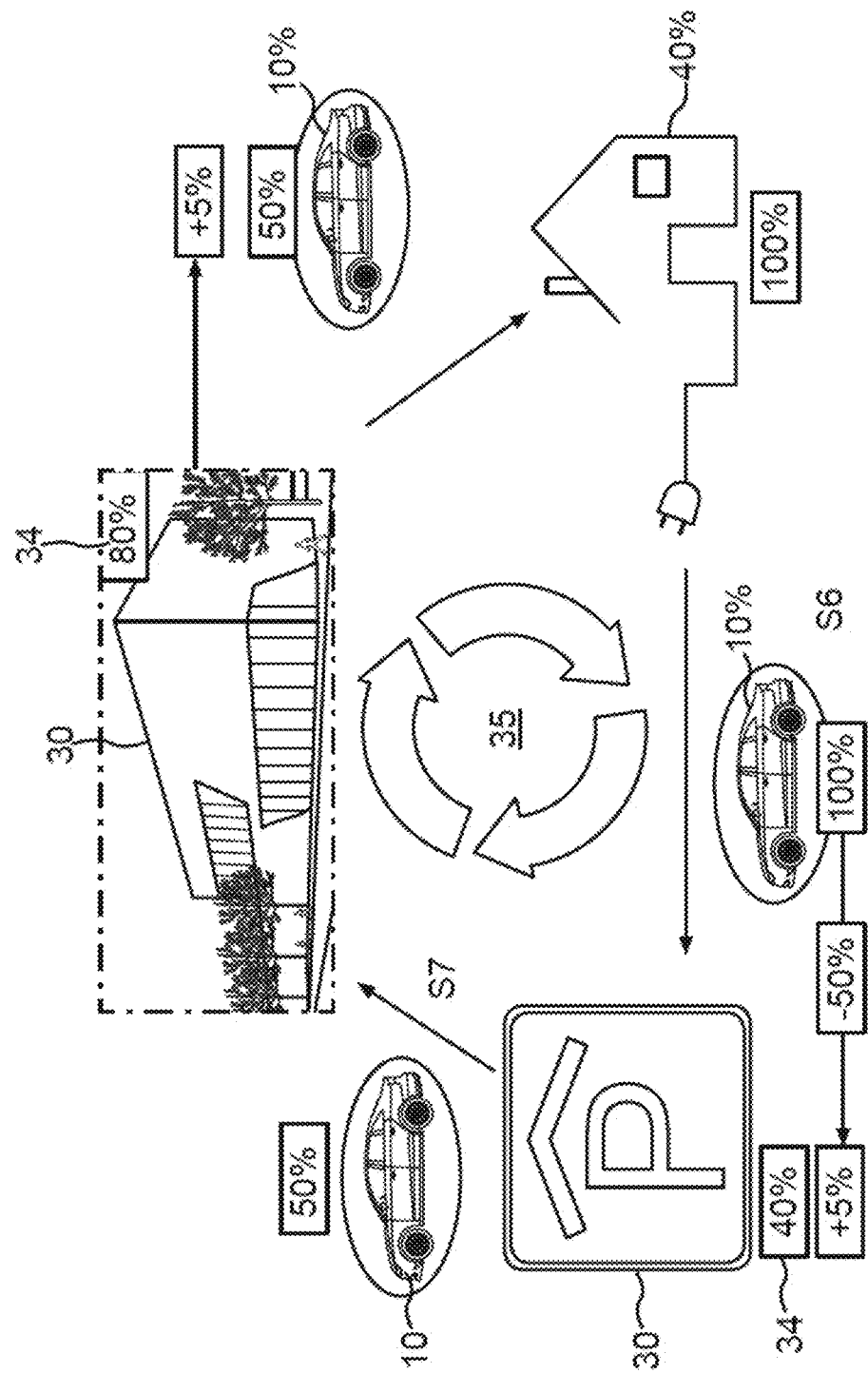
FIG. 2 a schematic sketch of another embodiment of the method according to the invention.

FIG. 2 illustrates another exemplary embodiment of a method according to the invention and shows an energy cycle 35 between a receiver and a transmitter. A motor vehicle 10, which may be configured for instance as an electric vehicle, is left by the user, for instance overnight, at a current receptacle of his own house 40 and is 100 percent charged. In the morning, the starting point of the state of charge at home is 100 percent of the energy content of the motor vehicle 10. The user then drives (S6) for instance into a parking garage as the facility 30, which may have only a 40 percent energy level on account of high electric charging demand, for example. The energy storage device 34 external to the motor vehicle of the facility 30 may, for example, store solar energy in the daytime and deliver it at night. Thus, the parking garage may attract the user of the motor vehicle 10 with "no-cost" parking. The parking garage may then utilize extra electricity for street lighting, for example.

As an alternative to a parking fee, the possibility of a delivery of energy from the motor vehicle 10 to the parking garage may exist, for example, 50 percent of an energy quantity of the motor vehicle 10, which may correspond for instance to 5 percent of the capacity of the parking garage. For this, the user of the motor vehicle 10 needs to park in the parking garage, for example.

After this, the motor vehicle 10 may drive further on to the employer (S7), for example, at which time the motor vehicle 10 may only still have 50 percent of the original energy quantity. Upon arriving there, the motor vehicle 10 may, for example, have only 45 percent of the original energy quantity at the destination. If the user is participating for instance in an electricity bonus system for employees who use an electric vehicle, and if the motor vehicle 10, for example, can consume 5 percent of the energy quantity of a fully charged energy storage device 12 per day for coming and going to work, then a facility 30 of the employer, which may have for instance an 80% charged energy storage device 34 external to the motor vehicle, can transfer an energy quantity to the energy storage device 12 of the motor vehicle 10 which may correspond to 5 percent of the total energy quantity of a fully charged energy storage device 12 of the motor vehicle 10. In other words, the facility 30 of the employer can transfer to the motor vehicle 10 of the user an energy bonus of 5 percent, for example.

Back at home, meanwhile, the home energy storage has been recharged and is again available to the motor vehicle 10.

Figure 3:
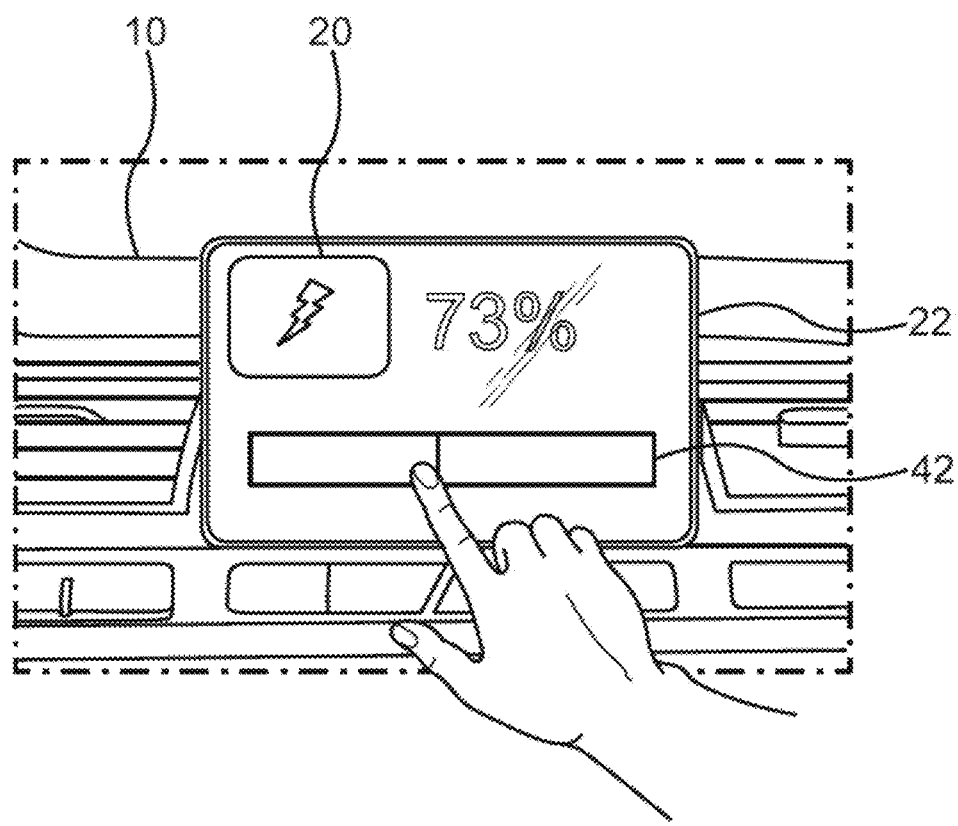
FIG. 3 a schematic sketch of another embodiment of the method according to the invention.

The output device 22, for example, may display a menu on a monitor screen, for instance upon pressing the first operator control element 10, i.e., the "electricity key", for example, on which one can determine the corresponding charge quantity to be provided. Such a menu is shown for example in FIG. 3. In this exemplary embodiment, all the other components and method steps as already described in FIG. 1 or FIG. 2 may be present, but for reasons of clarity they are not shown in FIG. 3, since this only enters into the particular details.

On the output device 22 there may be displayed a bar graph 42, for example, which may display an available charge volume of 73 percent, for instance. Using a swipe gesture, for example, the user may then decrease or increase the height of an electricity quantity to be delivered, for example. Similarly, for example, the monetary value may also be set. In this case, a corresponding operator control device 18 may be designed as an operator control device 18 such as is described for FIG. 1.

According to another exemplary embodiment, in a navigation menu of the navigation device 28 or the output device 22 a display may additionally be generated that provides information as to whether a parking garage can be paid by the first operator control element 20, i.e., the "electricity key", and/or by the second operator control element 20, i.e., by the "pay key", and/or whether a corresponding system is present there.

According to another exemplary embodiment, for example, during autonomous driving, the most lucrative parking garage may be automatically selected and the most traffic-favorable route to this parking garage may be selected, for example, by means of a collective or crowd-sourced intelligence. Corresponding information from other vehicles may be transmitted, for example, by a motor vehicle-to motor vehicle link or a motor vehicle-to X-link. Information such as traffic jam information can be taken into account and the fastest possible route or the most energy-saving route can be calculated.

The above described exemplary embodiments illustrate the principle of the invention to provide an operating concept by means of selection keys for the energy transfer. Since the possibility now exists of exchanging energy between a motor vehicle 10 and a facility 30 and/or vice versa, for example, from one motor vehicle 10 to another motor vehicle, the user has the choice or the possibility of paying with electricity, on the one hand, or with monetary means, on the other hand.

For example, in this case, according to another exemplary embodiment, a key pad may be arranged as the operator control device 18 in the interior of a motor vehicle 10, or a display may be generated in a multimedia interface display or in another way. The keys may be integrated in the multimedia interface, for example, as a touch screen or as pushbuttons, switches, or may be selected intuitively in the autonomous motor vehicle 10. The operator control elements 20 may then appear, for example, as represented in FIG. 1

The invention claimed is:

1. A method for a monetization of regenerative energy of a motor vehicle comprising the steps carried out by a control device of the motor vehicle:
receiving a first operator control signal from an operator control device of the motor vehicle;
activating at least one predetermined operating mode of the control device; and
receiving an enable signal from a data server device external to the motor vehicle for activating the control device, wherein the enable signal describes a regenerative energy quantity to be delivered and/or a monetary value for the use of a service or services of a facility comprising the data server device external to the motor vehicle,
wherein the at least one predetermined operating mode is activated via the first operator control signal received by a second operator control element of the operator control device and describes a user request to transmit a monetary value to the data server device external to the motor vehicle.

2. The method as claimed in claim 1, further comprising:
receiving a position signal from a navigation device of the motor vehicle, which describes a current position and a planned destination of the motor vehicle,
determining a location of an energy storage device external to the motor vehicle, this device being equipped to receive the regenerative energy quantity from the energy storage device of the motor vehicle, and
generating a navigation signal that describes an itinerary, taking into account the determined location of the energy storage device external to the motor vehicle and the planned destination, as a function of the position signal and the determined location.

3. The method as claimed in claim 2, further comprising:
controlling an output device of the operator control device as a function of the operating mode, wherein an illumination of at least one of the operator control elements and/or an output of an acoustic signal is controlled.

4. The method as claimed in claim 1, wherein in the at least one predetermined operating mode, the method further comprises:
receiving a further operator control signal;
coupling of the control device to a monetarization device of the motor vehicle;
generating a control signal, based on the further operator control signal, for transmitting the monetary value to the data server device external to the motor vehicle; and
transmitting the control signal to the monetarization device.

5. The method as claimed in claim 4, wherein the further operator control signal in the second operating mode describes a monetary value to be transmitted from the monetarization device to a monetarization device external to the motor vehicle.

6. A control device for a monetization of regenerative energy of a motor vehicle comprising:

at least one processor; and at least one memory operatively connected to the at least one processor, the at least one memory comprises instructions for the at least one processor to perform:

receiving a first operator control signal from an operator control device of the motor vehicle;

activating at least one predetermined operating mode of the control device; and receiving an enable signal from a data server device external to the motor vehicle for activating the control device, wherein the enable signal describes a regenerative energy quantity to be delivered and a monetary value for the use of a service or services of a facility comprising the data server device external to the motor vehicle, wherein the at least one predetermined operating mode is activated via the first operator control signal received by a second operator control element of the operator control device and describes a user request to transmit a monetary value to the data server device external to the motor vehicle.

7. A motor vehicle comprising the control device as claimed in claim 6.

* * * * *